US005676493A

United States Patent [19]
Brockway

[11] Patent Number: 5,676,493
[45] Date of Patent: Oct. 14, 1997

[54] COMPACTION MACHINE WHEEL

[75] Inventor: Robert John Brockway, Caledonia, Wis.

[73] Assignee: Terra Compactor Wheel Corp., Sheboygen, Wis.

[21] Appl. No.: 595,596

[22] Filed: Feb. 2, 1996

[51] Int. Cl.$^6$ .............................. E01C 19/26; E02D 3/02
[52] U.S. Cl. .................. 405/271; 404/171; 404/121; 404/129
[58] Field of Search .............. 405/271; 404/117, 404/118, 121, 133.1, 133.2, 133.05, 129

[56] References Cited

U.S. PATENT DOCUMENTS

| 2,541,007 | 2/1951 | Small | 404/121 |
|---|---|---|---|
| 3,085,484 | 4/1963 | McAdams et al. | 404/121 |
| 3,318,209 | 5/1967 | Schultz | 404/121 |
| 3,340,783 | 9/1967 | Edminster | 404/121 |
| 3,891,342 | 6/1975 | Roe | 404/128 |
| 4,302,129 | 11/1981 | Arenz | 404/117 |

*Primary Examiner*—Tamara L. Graysay
*Assistant Examiner*—Tara L. Mayo
*Attorney, Agent, or Firm*—Killworth Gottman Hagan & Schaeff LLP

[57] ABSTRACT

The present invention enables waste to be removed from behind a compaction wheel without having to remove the wheel from the compaction machine. The present compaction wheel allows access through the compaction wheel to a portion of the axle located behind the wheel, thereby saving the cost associated with removing the compaction wheel and improving productivity by reducing the amount of down time needed to service and inspect each compaction wheel, its axle and the portions of the compaction machine hidden by each wheel. Each compaction wheel includes an access opening disposed between a wheel hub and outer rim and operatively adapted to allow access to and permit removal of waste from around a portion of the axle located behind the compaction wheel, while the compaction wheel is mounted on the axle. The access opening can be of a sufficient size to allow the passage of the head and one or both arms of a worker therethrough and can also be operatively adapted to allow access through the front side of the compaction wheel to a portion of the axle located behind the wheel. A removable cover or hatch is mounted on each wheel so as to substantially close its access opening to prevent waste from passing through each access opening and accumulating behind each wheel, while the compaction machine is being operated.

19 Claims, 3 Drawing Sheets

COMPACTION MACHINE WHEEL

FIELD OF THE INVENTION

The present invention is related to heavy equipment wheels, more particularly, to the wheels on a compaction machine, such as those used to compact landfills and, even more particularly, to a compaction machine wheel which allows waste and refuse to be removed from behind the wheel without having to remove the wheel from the machine.

BACKGROUND OF THE INVENTION

Compaction machines are used to compact landfill sites, garbage dumps and other such locations. These machines typically include a self-propelled vehicle having four large wheels made of steel. Each wheel has a hub mounted to one end of an axle and a rim disposed around and radially out from the hub. The rim typically includes an outer wrapper on which a plurality of cleats are usually mounted. One problem encountered by such machines is the accumulation of waste behind the compaction wheel. Waste materials such as steel cable, wire, rope and the like have a particularly detrimental effect. Such refuse tends to wrap around the axles of the compaction machine and become trapped between the wheel and its axle, increasing the corresponding frictional forces therebetween. Increasing the friction between the wheel and its axle increases the load on the wheel propulsion system (e.g., an internal combustion engine) and reduces the life of the compaction machine. In addition, such increased frictional forces can cause the compaction wheels to wear to the point of requiring repair or even replacement of the wheels. Such wear related repairs can be very costly, and replacement wheels are very expensive.

Previously, the only way to prevent the buildup of waste behind the wheels and the corresponding premature wear and tear on the compaction machine was to periodically remove each compaction wheel so that refuse trapped between the wheel and the axle can be removed. Removing the compaction wheels on a compaction machine is a labor intensive and time consuming process. Compaction wheels can have an outside diameter of up to 84 inches and weigh up to five tons per wheel. It can take up to three working days or more to remove, clean and inspect the wheels and axles of a typical compaction machine. Such down time can result in lost income from refuse left uncompacted. In addition, most trash dumping sites do not have backup compaction machines available to take over during the down times. The operator of, for example, a landfill risks being charged federal and state fines for each day the trash at the site remains uncompacted.

It has been known to weld hollow pipes into the side walls of some compaction wheels, adjacent to the hub, to allow the space behind the wheel to be viewed. Such pipes have inside diameters in the range of 4–12 inches. These hollow pipes are only intended to allow an operator to see the buildup of refuse behind the compaction wheels and determine when the wheels require servicing. However, these pipes typically become plugged with debris from the refuse being compacted and preventing the area behind the wheel to be viewed.

In an effort to reduce the rate of waste buildup between each compaction wheel and its corresponding axle, an annular plate has been mounted around each end of the axle, adjacent to the back side of each compaction wheel. Typically, the axle is mounted for rotation within an axle housing and the annular plate is mounted to extend radially out from the axle housing. However, this annular plate has only slowed down, if at all, the buildup of waste between the wheel and its axle.

Accordingly, there is a need for a way to remove waste from behind a compaction wheel without having to remove the compaction wheel from the machine, as well as a way to further reduce, if not eliminate, the rate of waste buildup between a compaction wheel and its axle.

SUMMARY OF THE INVENTION

The present invention satisfies these needs. Waste can be removed from behind a compaction wheel without having to remove the compaction wheel from the machine, according to the present invention, by providing a compaction wheel which allows access through the compaction wheel to a portion of the axle located behind the wheel. In this way, not only is the cost associated with removing each compaction wheel saved, but the present invention improves productivity by also reducing the amount of down time needed to service (e.g., clean away debris) and inspect each compaction wheel, each axle and the portions of the compaction machine hidden by each wheel.

In one aspect of the present invention, a compaction wheel is provided which includes a hub operatively adapted for mounting on the axle of a compaction machine, a rim disposed around and radially out from the hub, and an access opening disposed between the hub and the rim or outer wrapper. The access opening is operatively adapted to allow access to and permit removal of waste from around a portion of the axle located behind the compaction wheel, while the compaction wheel is mounted on the axle. The access opening can be of a sufficient size to allow the passage of the head and one arm or the head, shoulder and both arms of a worker therethrough. It is desirable for the access opening to be operatively adapted to allow access through the front side of the compaction wheel to the portion of the axle located behind the compaction wheel. It is also desirable for the access opening to be wide enough to allow a worker to reach and remove refuse from behind the wheel using a tool (e.g., an oxy-acetylene cutting torch, a hand held grinder, cutting shears, and the like).

A removable cover or hatch can be mounted on each of the present compaction wheels so as to substantially close its access opening. Such a cover prevents waste from passing through the access opening and accumulating behind the wheel, while the compaction machine is being operated. In one embodiment of the present compaction wheel, the access opening is defined by a frame and the cover is operatively adapted for being removably secured to the frame. In addition to the frame, additional intermediate structure, between the hub and the rim, can include two semi-circular plates that are generally parallel to one another and which interconnect the hub and the rim. Each of these semi-circular plates has two ends, with the access opening being disposed between the ends of both plates.

In another aspect of the present invention, a compaction machine is provided which includes some form of vehicle having a body and at least one axle mounting one or more of the present compaction wheels, as described above. It is desirable for at least two of the wheels on the compaction machine to be compaction wheels according to the present invention, with one wheel mounted on either end of an axle. For a four-wheeled compaction machine, it is even more desirable for all four wheels to be compaction wheels according to the present invention, with one pair of the wheels being mounted on an axle.

Some compaction machines, having at least one axle mounting a compaction wheel at each end, includes a dozer blade which must be removed before the compaction wheels can be removed. One such dozer blade is mounted on the compaction machine using two pivot arms disposed outside of the compaction wheels so as to block the removal of the wheels from the axle. Use of the present compaction wheels is even more desirable on such compaction machines because it eliminates the need for having to remove the dozer blade, as well as the wheel itself.

Some compaction wheels have a waste entry site located on their back side which provides a path for waste to enter an inner wheel space disposed between the compaction wheel and a leading portion of the axle. With such a compaction wheel, the access opening is operatively adapted to allow access through the front side of the compaction wheel and into the inner wheel space. Waste trapped in the inner wheel space (e.g., wrapped around the leading portion of the axle) can then be removed through the access opening. It is desirable for a compaction machine mounting such wheels to include a trap system which effectively reduces the size of the waste entry site to trap most, if not all, of the waste outside of the inner wheel space.

For a number of compaction machines, each axle is mounted for rotation inside an axle housing which does not rotate with the axle. The axle housing, for example, can be fixedly mounted to the body of the vehicle so that the housing remains relatively stationary while the axle rotates. One trap system that can be used with each wheel of such a compaction machine includes an annular plate mounted around the outside of the axle housing. This annular plate is disposed adjacent to the back side of the compaction wheel so as to reduce the effective size of the waste entry site. It may be desirable for the annular plate to contact the back side of the compaction wheel.

To reduce the effective size of the waste entry site even further, an annular ring can be mounted between the back side of the wheel rim and the annular plate. It is desirable for this annular ring to be mounted snugly against the back side of the wheel rim. It may also be desirable for another annular ring to be mounted on the annular plate adjacent to an inside diameter surface of the wheel rim so as to further reduce the effective size of the waste entry site. It is also desirable for this other annular ring to be mounted snugly against the inside diameter surface of the wheel rim. These two annular rings can be used separately as well as together. Furthermore, the present invention is not intended to be limited to the use of one, two or any number of such annular rings.

It is desirable for a compaction machine, according to the present invention, to include the present compaction wheels in addition to the present trap system. However, it is also advantageous to use the present trap system with conventional compaction wheels to further reduce, if not eliminate, the rate of waste buildup between the compaction wheel and its axle (i.e., within its inner wheel space).

The objectives, features, and advantages of the present invention will become apparent upon consideration of the specification and the appended drawings.

DETAILED DESCRIPTION OF THE INVENTION

Although the present invention is herein described in terms of a specific embodiment, it will be readily apparent to those skilled in this art that various modifications, rearrangements, and substitutions can be made without departing from the spirit of the invention. The scope of the present invention is thus only limited by the claims appended hereto.

Figure 1:
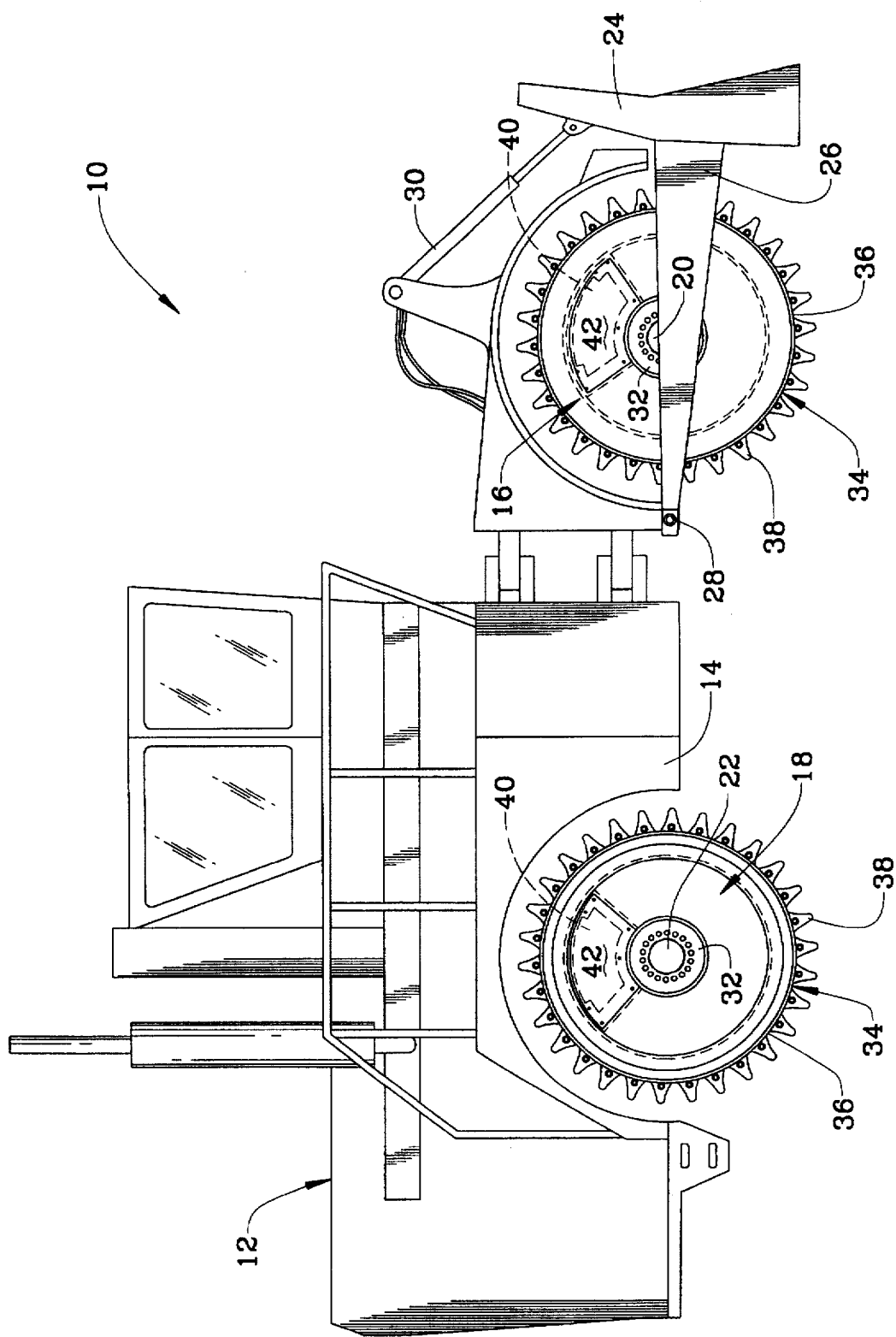
FIG. 1 is a side view of one type of compaction machine having wheels according to one embodiment of the present invention.

Referring to FIG. 1, one embodiment of a compaction machine 10 incorporating the principals of the present invention includes a self-propelled vehicle 12 powered, for example, with a diesel engine (not shown) and having a body 14, a pair of forward compaction wheels 16 and a pair of rear compaction wheels 18. While other materials and fabrication techniques may be used and, therefore, the present invention is not intended to be so limited, satisfactory results have been obtained by making each of the wheels 16 and 18 from welded steel plate construction. The forward and rear wheels 16 and 18 are mounted, such as by being bolted (e.g., with lugs), one wheel on either end of a forward axle 20 and a rear axle 22, respectively. At least a leading portion, at either end, of each axle 20 and 22 is mounted for rotation inside an axle housing 21. Each axle housing 21 is fixedly mounted to the body 14 of the vehicle 12 so that the housing 21 remains relatively stationary while the axles 20 and 22 rotate with the wheels 16 and 18. The exemplary compaction machine 10 described herein also includes a dozer blade 24. The dozer blade 24 is pivotally mounted on the forward end of the vehicle body 14 using two pivot arms 26. The arms 26 are disposed one on the outside of each forward wheel 16. Each pivot arm 26 is pivotable about a pivot pin 28 using one or more hydraulic cylinder units 30 mounted between the forward wheels 16. With the pivot arms 26 located outside of the forward wheels 16, the dozer blade must be removed before the forward wheels 16 can be removed. While the present invention is being described herein with regard to a particular type of compaction machine, the present is not intended to be so limited.

Each of the compaction wheels 16 and 18 includes a hub 32 operatively adapted (e.g., with a plurality of lug holes) for being mounted on the end of its corresponding axle 20 and 22. A wheel rim 34 is disposed around and radially out from each hub 32. Each rim 34 includes an outer wrapper 36. A plurality of cleats 38 are preferably mounted on the outer wrapper 36. An access opening 40 is disposed between the hub 32 and the rim 34 of each compaction wheel 16 and 18 and provides physical access and a view to the space behind each of the wheels 16 and 18 without having to remove the wheels 16 and 18. Each of the compaction wheels 16 and 18 preferably includes a cover or hatch 42 removably mounted, such as with bolts and/or a hinge, so as to substantially close its access opening 40. It may be desirable for the hatch 42 to include a handle fixed thereon to facilitate its closing of or removal from the access opening 40.

Referring to FIGS. 2–5, each of the particular access openings 40 shown allows access through the front side of its corresponding wheel 16 and 18 to an inner wheel space or cavity 44. One inner wheel space is disposed between each of the compaction wheels 16 and 18 and the leading portion of its corresponding axle 20 and 22. Each access opening 40 is also of a size to allow waste to be removed from behind its corresponding compaction wheel 20 and 22, without having to remove the wheel from its axle. It is desirable for the access opening 40 in each wheel 16 and 18 to have an area of at least about 170 in$^2$ (about 1097 cm$^2$). It is more desirable for each access opening 40 to have an area of at least about 200 in$^2$ (about 1290 cm$^2$), and it is even more desirable for each access opening 40 to have an area of at least about 230 in$^2$ (about 1484 cm$^2$). Each access opening 40 is preferably of a sufficient size to allow the passage of the head and one or both arms of a worker therethrough to facilitate the removal of waste from behind each of the wheels 16 and 18 and, in particular, from within each inner wheel space 44.

Figure 2:
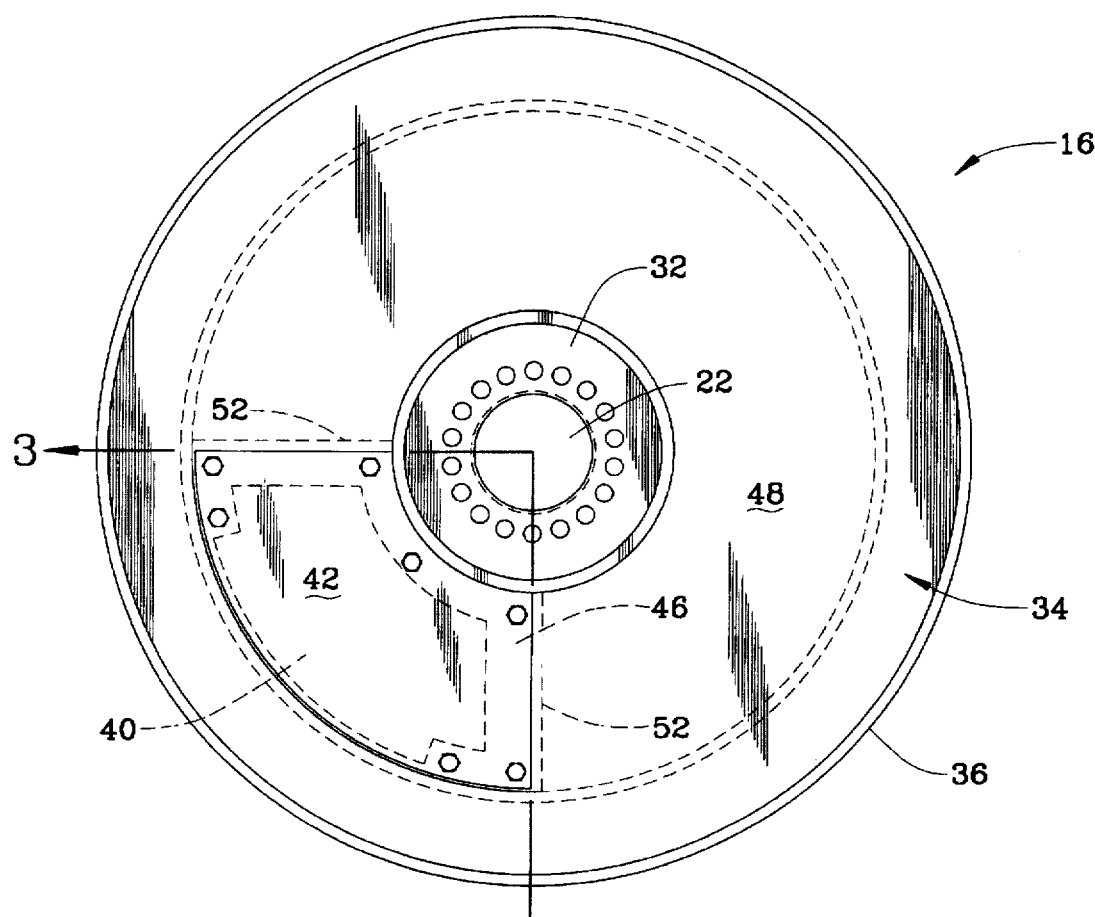
FIG. 2 is a plan view of the front side of one of the forward wheels on the compaction machine of FIG. 1, with its access hatch in place and without its cleats.
Figure 3:
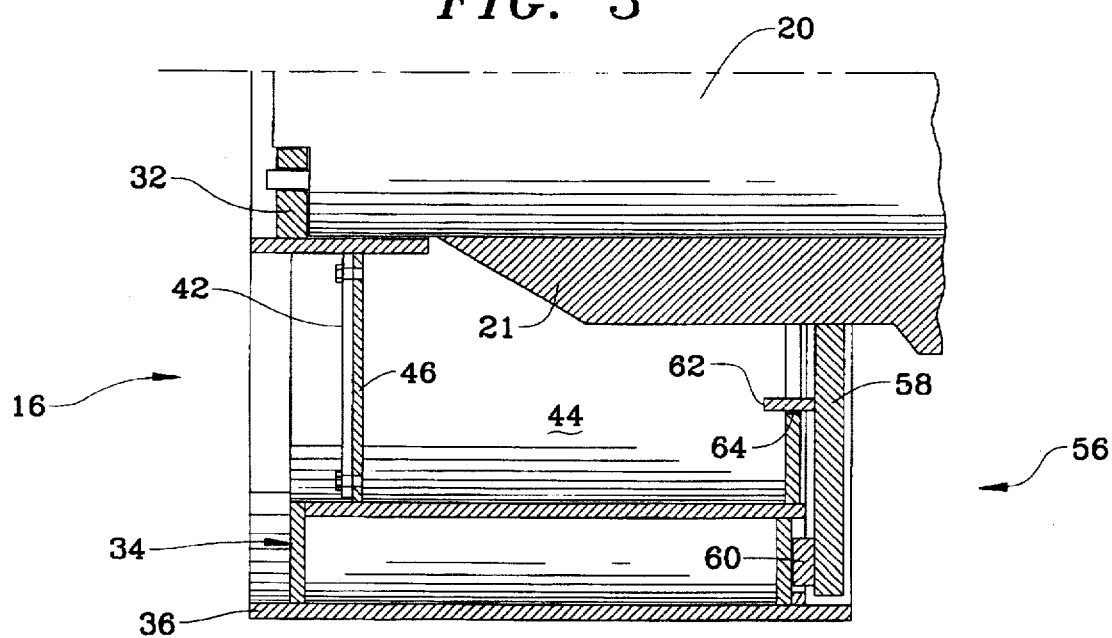
FIG. 3 is a sectional view, taken along lines 3—3, of the forward wheel of FIG. 2 mounted on one end of an axle shown in cross-section.
Figure 4:
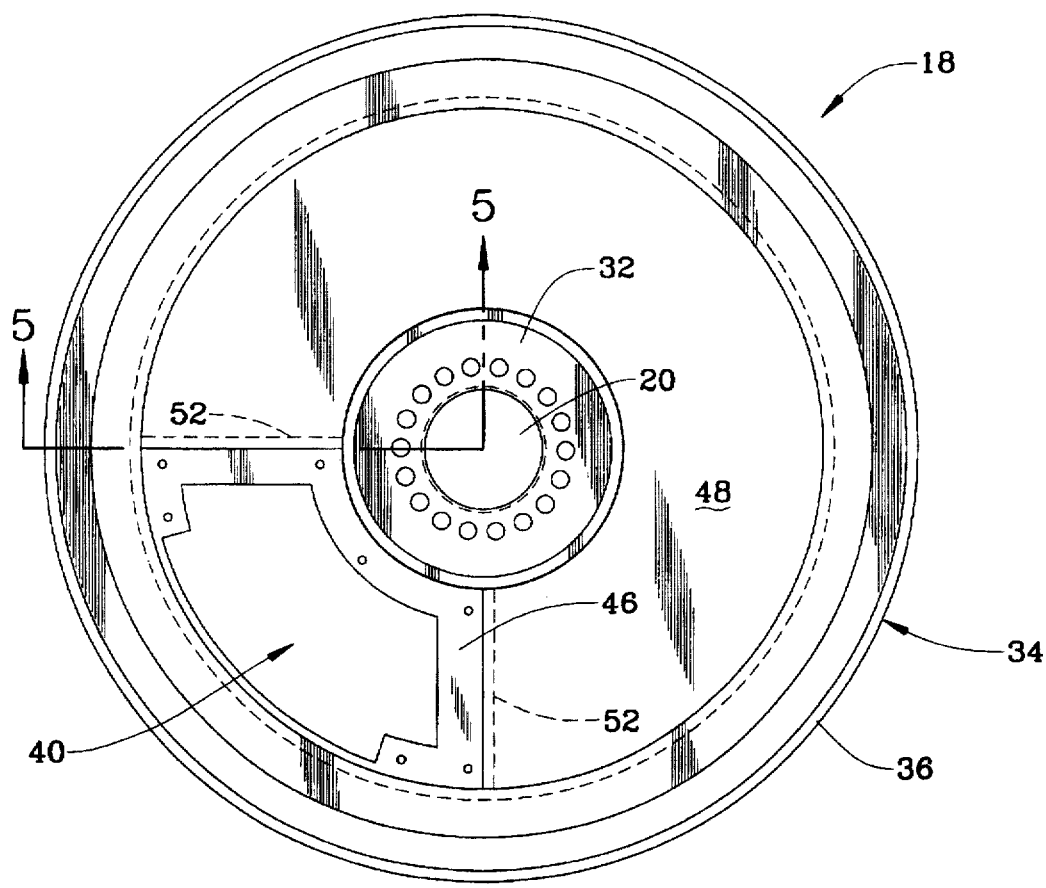
FIG. 4 is a plan view of the front side of one of the rear wheels on the compaction machine of FIG. 1, with its access hatch removed and without its cleats.

Each access opening 40, of the exemplary compaction wheels 16 and 18 described in detail herein, is defined by a frame 46 on which one corresponding cover plate 42 is removably mounted, for example, with bolts (see FIGS. 2 and 3). Additional intermediate structure interconnecting the hub 32 and rim 34 of each of the wheels 16 and 18, includes a semi-circular front plate 48 and back plate 50 that are generally parallel to one another. The front portion of each of the wheels 16 and 18 is partially formed by its corresponding front plate 48. Each access opening 40 has an area of approximately one quarter of the front portion, between the hub 32 and the rim 34, of its corresponding wheel. The inner wheel space 44 of each of the wheels 16 and 18 is partially defined by its corresponding back plate 50. Each frame 46 has opposite ends with each end mounted to a butt plate 52. One butt plate 52 is mounted at either end of each pair of semi-circular plates 48 and 50, between the plates 48 and 50.

Figure 5:
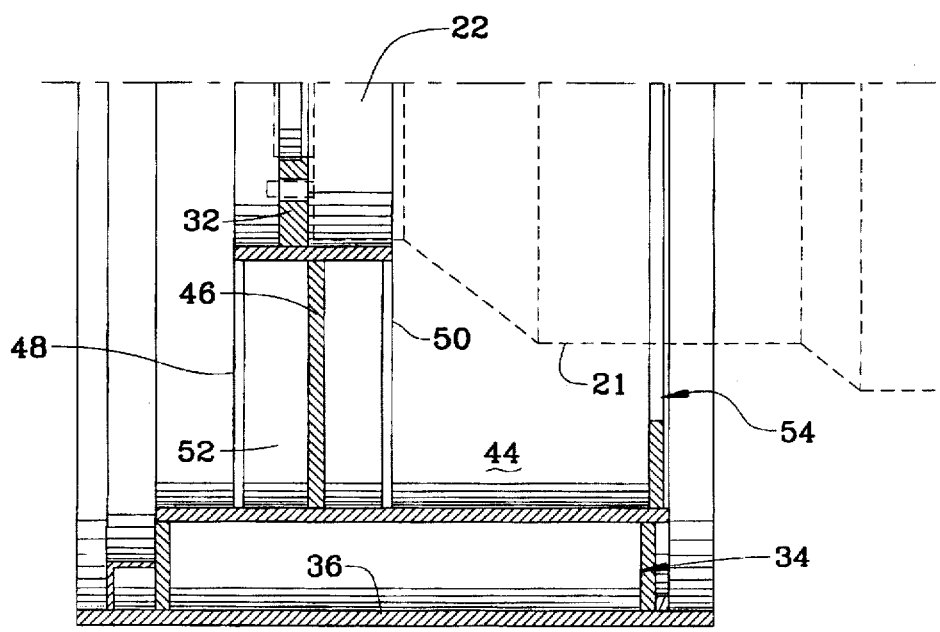
FIG. 5 is a sectional view, taken along lines 5—5, of the rear wheel of FIG. 4 mounted on one end of an axle shown in phantom.

Each of the compaction wheels 16 and 18 has a waste entry site 54 located on its back side (see FIGS. 3 and 5). Each waste entry site 54 provides a path for waste to enter its corresponding inner wheel space 44 from behind the wheel. Waste which enters the inner wheel space 44 through its entry site 54 can be removed through the corresponding access opening 40 by removing the cover plate 42 (see FIG. 5), rather than having to remove the entire compaction wheel. Even with such an access opening 40, it is still desirable for the compaction machine 10 to include a trap system, for each of the wheels 16 and 18, which effectively reduces the size of each waste entry site 54 so as to trap most, if not all, of the waste outside of each corresponding inner wheel space 44.

Referring to FIG. 3, one trap system 56 includes an annular plate 58 mounted around the outside of each axle housing 21. Each annular plate 58 is disposed adjacent to, and preferably snugly against, the back side of its corresponding compaction wheel so as to reduce the effective size of each waste entry site 54. To further reduce the effective size of each waste entry site 54, a first annular ring 60 is mounted on the annular plate 58 so as to be disposed snugly against the back side of the corresponding wheel rim 34. A second annular ring 62 is also mounted on each annular plate 58 but disposed snugly against an inside diameter surface or edge 64 formed on the back side of the corresponding wheel rim 34. In this way, the rate of intrusion of waste through each waste entry site 54 and into each inner wheel space 44 can be significantly reduced, if not eliminated. In addition to the desirability of being used with compaction wheels according to the present invention, it is also advantageous to use such a trap system 56 with a conventional compaction wheel (i.e., without an access opening) to further reduce, if not eliminate, the rate of waste buildup between the conventional wheel and its corresponding axle.

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. A compaction wheel for mounting on an axle of a compaction machine, said compaction wheel comprising:

a front side and a back side;

a waste entry site on said back side which provides a path for waste to enter an inner wheel space disposed between said compaction wheel and a portion of an axle of a compaction machine mounting said compaction wheel;

a hub operatively adapted for mounting on the axle of the compaction machine;

a rim disposed around and radially out from said hub; and an access opening disposed between said hub and said rim, said access opening allowing access through said front side to said inner wheel space and permitting removal of waste trapped in said inner wheel space, while said compaction wheel is mounted on the axle.

2. A compaction wheel as set forth in claim 1, wherein said access opening has an area of at least about 170 in$^2$ (1097 cm$^2$).

3. A compaction wheel as set forth in claim 1, wherein said compaction wheel further comprises a removable cover mounted so as to substantially close said access opening.

4. A compaction wheel as set forth in claim 3, wherein said compaction wheel further comprises a frame defining said access opening between said hub and said rim, and said cover is operatively adapted for being removably secured to said frame so as to substantially close said access opening.

5. A compaction wheel for mounting on an axle of a compaction machine, said compaction wheel comprising:

a front side and a back side;

a waste entry site on said back side which provides a path for waste to enter an inner wheel space disposed between said compaction wheel and a portion of an axle of a compaction machine mounting said compaction wheel;

a hub operatively adapted for mounting on the axle of the compaction machine;

a rim disposed around and radially out from said hub;

an access opening disposed between said hub and said rim, said access opening allowing access through said front side to said inner wheel space and permitting removal of waste from between a portion of the axle and said compaction wheel, while said compaction wheel is mounted on the axle; and a removable cover mountable to substantially close said access opening.

6. A compaction wheel as set forth in claim 5, wherein said rim includes an outer wrapper on which a plurality of cleats are mounted.

7. A compaction wheel as set forth in claim 5, wherein said compaction wheel further comprises an intermediatestructure between said hub and said rim which includes a frame defining said access opening, and said cover is operatively adapted for being removably secured to said frame so as to substantially close said access opening.

8. A compaction wheel as set forth in claim 7, wherein said intermediate structure is annular shaped and further comprises two semi-circular plates that are generally parallel to one another and interconnected between said hub and said rim, each of said semi-circular plates has two ends, and said access opening is disposed between the ends of said semi-circular plates.

9. A compaction machine comprising:
   a vehicle having a body and at least one axle mounting at least one compaction wheel, said compaction wheel comprising:
   a front side and a back side, with said back side facing said body,
   a waste entry site on said back side which provides a path for waste to enter an inner wheel space disposed between said compaction wheel and a portion of an axle of a compaction machine mounting said compaction wheel,
   a hub operatively adapted for being mounted on said axle,
   a rim disposed around and radially out from said hub,
   an access opening disposed between said hub and said rim, said access opening allowing access through said front side of said compaction wheel to remove waste from between said back side of said compaction wheel and said vehicle body, while said compaction wheel is mounted on said axle, and
   a removable cover mounted to substantially close said access opening.

10. The compaction machine as set forth in claim 1, wherein said at least one compaction wheel is two compaction wheels, one mounted on either end of said axle.

11. The compaction machine as set forth in claim 9, wherein said at least one compaction wheel is four compaction wheels, said at least one axle is two axles, and each of said axles mounts two of said compaction wheels.

12. The compaction machine as set forth in claim 11, wherein said axles include a first axle, said compaction wheels include two first compaction wheels mounted on said first axle, and said compaction machine includes a dozer blade mounted on two pivot arms disposed outside of said first compaction wheels so as to block the removal of said first compaction wheels from said first axle.

13. The compaction machine as set forth in claim 9, wherein said compaction machine further comprises a trap system for effectively reducing the size of said waste entry site and trapping waste outside of said inner wheel space.

14. The compaction machine as set forth in claim 13, wherein said axle is mounted for rotation inside an axle housing, and said trap system comprises an annular plate mounted around the outside of said axle housing, said annular plate is disposed adjacent to the back side of said compaction wheel so as to effectively reduce the size of said waste entry site.

15. The compaction machine as set forth in claim 14, wherein said rim has a back side, and an annular ring is mounted on said annular plate between the back side of said rim and said annular plate so as to further reduce the effective size of said waste entry site.

16. The compaction machine as set forth in claim 14, wherein said rim has a back side, the back side of said rim has an inside diameter surface, and an annular ring is mounted on said annular plate adjacent to said inside diameter surface so as to further reduce the effective size of said waste entry site.

17. The compaction machine as set forth in claim 14, wherein said rim has a back side, the back side of said rim has an inside diameter surface, and a first annular ring and a second annular ring are mounted on said annular plate, one ring between the back side of said rim and said annular plate and the other ring adjacent to said inside diameter surface, so as to further reduce the effective size of said waste entry site.

18. A compaction machine comprising:
   a vehicle having a body, at least one axle mounted for rotation inside an axle housing and mounting at least one compaction wheel, said compaction wheel having a back side and comprising:
   a hub operatively adapted for being mounted on said axle,
   a rim disposed around and radially out from said hub, said rim having a back side, and
   a waste entry site located on the back side of said compaction wheel between said rim and said axle, providing a path for waste to enter an inner wheel space disposed between said compaction wheel and a leading portion of said axle; and a trap system for reducing the effective size of said waste entry site and trapping waste outside of said inner wheel space, said trap system comprising:
   an annular plate mounted around the outside of said axle housing and disposed adjacent to the back side of said compaction wheel, and
   a first annular ring mounted on said annular plate between the back side of said rim and said annular plate.

19. The compaction machine as set forth in claim 18, wherein the back side of said rim has an inside diameter surface, and said trap system further comprises a second annular ring mounted on said annular plate adjacent to said inside diameter surface so as to further reduce the effective size of said waste entry site.

* * * * *

UNITED STATES PATENT AND TRADEMARK OFFICE
CERTIFICATE OF CORRECTION

PATENT NO. : 5,676,493
DATED : October 14, 1997
INVENTOR(S) : Robert J. Brockway It is certified that error appears in the above-indentified patent and that said Letters Patent is hereby corrected as shown below:

On the title page, item:

[73] Line 2, "Sheboygen" should be --Sheboygan--.

Claim 10, line 1, "as set forth in claim 1," should be --as set forth in claim 9,--.

Signed and Sealed this

Twenty-seventh Day of January, 1998

Attest:

BRUCE LEHMAN

Attesting Officer

Commissioner of Patents and Trademarks